Dec. 14, 1954 W. H. WANNAMAKER, JR., ET AL 2,697,191
FOLLOW-UP TYPE OF MEASURING APPARATUS
Filed Aug. 5, 1952
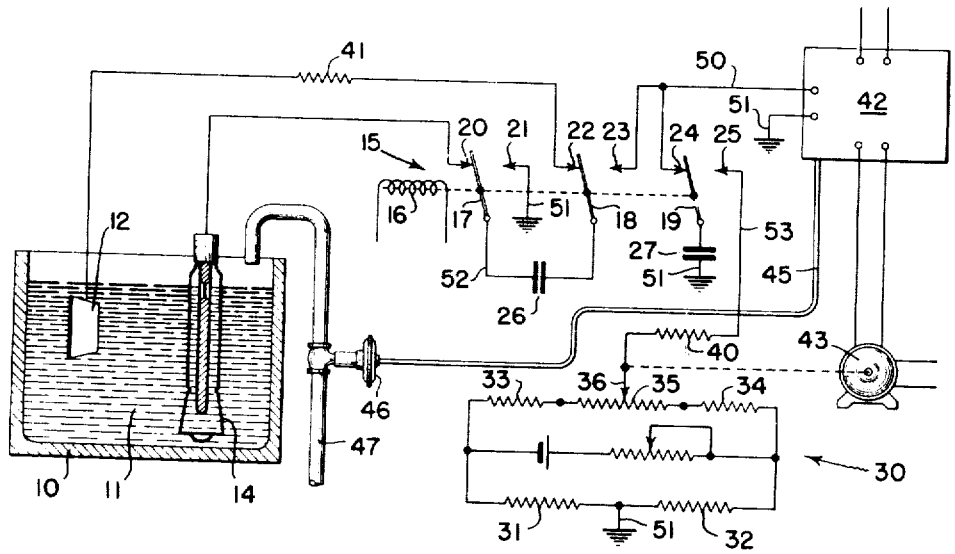
INVENTORS
WILLIAM H. WANNAMAKER JR.
GERALD C. MAYER
BY
ATTORNEY.

United States Patent Office 2,697,191
Patented Dec. 14, 1954

2,697,191

FOLLOW-UP TYPE OF MEASURING APPARATUS

William H. Wannamaker, Jr., and Gerald C. Mayer, Philadelphia, Pa., assignors to Minneapolis-Honeywell Regulator Company, Minneapolis, Minn., a corporation of Delaware Application August 5, 1952, Serial No. 302,676

12 Claims. (Cl. 318—28)

A general object of the present invention is to provide an improved measuring apparatus for small direct electrical potentials. More specifically, the present invention is concerned with an improved measuring apparatus wherein it is desired to isolate an electrical signal producing source from a balancing signal source as well as from a signal utilization circuit.

In certain types of process control, especially those wherein control is being made of an oxidation-reduction reaction, the state of the reaction may be determined by an electrical characteristic of the reaction. This state of the reaction is generally determined by an electrical potential existing upon a suitable electrode placed in the reaction, said electrode assuming a potential which will depend upon the relative concentration of oxidized and reduced ions in the solution wherein the reaction is being measured. The potential electrode is generally selected to be of an inert material or metal which will not be attacked by the solution and which will not catalyze any side reactions when immersed in the solution. In order to determine what the electrical potential is on the electrode, it is essential that some further electrical contact be made to the solution so that a complete electrical circuit will be had. The contacting electrode is generally in the form of a calomel electrode. Some types of contacting or reference electrodes are subject to polarization if the electrode is grounded and therefore the circuit must not affect the electrode. This polarization difficulty arises particularly where the reaction container is grounded so that the liquid is grounded and there is a resultant error or polarization or both which make accurate measurement impossible. Further, if the measuring apparatus is positioned any distance from the measuring electrodes the electrical circuit will be subject to magnetic and electric fields which may cause an adverse alternating current signal on the input of the signal utilization circuit. Such signals must be eliminated. It is further desirable to stabilize the operation of the electrical measuring circuit so that there will be not hunting of the signal utilization circuit.

It is therefore an object of the present invention to provide a new and improved direct electrical potential measuring apparatus.

Another object of the present invention is to provide a new and improved potential measuring apparatus for a variable source of potential wherein said source of potential and a balancing potential are alternately applied to a signal utilization circuit and said variable source is isolated from the signal utilization circuit.

Still another object of the present invention is to provide a measuring apparatus for a variable source of potential wherein said source is isolated from the signal utilization circuit by vibratory switching means and a source of balancing potential is isolated from the variable source of potential.

Still another object of the present invention is to provide a new and improved stabilized measuring apparatus for an electrical potential by providing electrical damping of a measured source of potential, providing further damping of a rebalancing source of potential, and selecting the damping so as to provide stabilization of the measuring circuit.

A further object of the present invention is to provide a new and improved electrical measuring apparatus for a source of unknown potential comprising a pair of electrodes, one of which is subject to polarization, with means for isolating the unknown source of potential from a signal utilization circuit, preventing polarization of any electrode in the source, and isolating the unknown source from a source of balancing potential.

The various features of novelty which characterize the invention are pointed out with particularity in the claims annexed hereto and forming a part of the specification. For a better understanding of the invention, however, its advantages, and specific objects attained with its use, reference should be had to the accompanying drawings and descriptive matter in which is illustrated and described a preferred embodiment of the invention.

The single figure is a schematic showing of a preferred embodiment of the present invention.

Referring now to the single figure, the numeral 10 represents a container having therein a solution 11 which may be undergoing an oxidation-reduction reaction. Positioned in the solution 11 is an electrode 12 which is selected to be of an inert metal which is not attacked by the solution and which will not catalyze side reactions. One such electrode is platinum although others may be used. The contacting or reference electrode for the solution 11 is indicated at 14 and this is a calomel electrode of standard type.

The electrode 12 and electrode 14 are connected to vibratory switching means in the form of a synchronous vibrator 15. This vibratory switching means comprises a driving coil 16 which is arranged to drive a plurality of blades 17, 18, and 19. The blade 17 is arranged to cooperate with a pair of contacts 20 and 21. The blade 18 is arranged to vibrate between a pair of contacts 22 and 23, and blade 19 is arranged to vibrate between a pair of contacts 24 and 25. A condenser 26 is connected between the blades 17 and 18 while condenser 27 is connected between the blade 19 and ground.

An adjustable source of potential in the form of an electrical bridge network is indicated generally at 30. This bridge network comprises a plurality of fixed resistors 31, 32, 33, and 34 which are connected as legs of the bridge. A potentiometer slide wire 35 is connected between the resistors 34 and 33 and has a slider 36 cooperating therewith.

A resistor 40 is positioned between the adjustable source of potential 30 and the vibratory switching means. A resistor 41 is connected between the electrode 12 and the vibratory switching means contact 22.

The numeral 42 represents a suitable electronic amplifier which will amplify alternating current signals and will produce an alternating current signal on the output thereof which will be suitable for driving a reversible two phase motor such as the motor 43. The output phasing of the signal from the amplifier 42 will be dependent upon the relative magnitudes of the potentials from the unknown source of potential and the adjustable source of potential 30 as will be explained hereinafter. The amplifier 42 and the motor 43 may be of the type shown in the Walter P. Wills Patent 2,423,540, issued July 8, 1947. The output of the Wills amplifier may be in the form of a pneumatic signal which is fed through a conduit 45 to a pneumatic valve 46, the latter of which may be used to control the flow of one of the elements flowing into the solution 11 through a conduit 47.

In considering the operation of the present apparatus, it should first be noted that the electrode 12 will assume an electrical potential which should be proportional to the ionization of the oxidation-reduction solution 11. The calomel reference electrode will complete the electrical circuit for the measuring of the potential on the electrode 12. When the vibrator 15 is in the position shown upon the drawing the blades 17 and 18 will be engaging their respective contacts 20 and 22. This will mean that there is an electrical circuit completed to the condenser 26. This circuit may be traced from the electrode 12 through the resistor 41, switch contact 22, switch blade 18, condenser 26, blade 17, contact 20, back to the reference electrode 14 in the solution 11. This will mean that the condenser 26 will assume a potential which is proportional to the electrical potential on the electrode 12.

On the next half cycle of operation of the vibratory switching means 15, the blades 17 and 18 will move into engagement with their respective contacts 21 and 23. This will mean that the condenser 26 will be connected to the input of the amplifier 42 and the circuit for this may be traced from the right hand terminal of the condenser 26 through the blade 18, contact 23, conductor 50, amplifier 42, ground 51, contact 21, blade 17, and conductor 52 back to the left hand terminal of the condenser 26. This will apply a potential to the input of the amplifier 42 which will be proportional to the potential existing on the electrode 12, and this will be in the form of a pulse whose duration will be dependent upon the time that the blades 17 and 18 are engaging the contacts 21 and 23.

During the same interval that the condenser 26 is connected to the input of the amplifier 42, the condenser 27 is connected to the balancing source of potential 30 and will assume a charge which will be proportional to the unbalanced condition of the balancing source 30. The circuit for this may be traced from the slider 36 through resistor 40, conductor 53, contact 25, blade 19, condenser 27, ground 51, back to the balancing source 30.

On the next half cycle of operation when the blades 17 and 18 are moved back into engagement with their respective contacts 20 and 22, the blade 19 will be moved into engagement with the contact 24. When the blade 19 engages contact 24 there will be applied to the input of the amplifier 42 a further pulse of potential which will be proportional to the unbalance condition of the network 30. This circuit may be traced from the upper terminal of the condenser 27 through the blade 19, contact 24, conductor 50, ground 51, back to the lower terminal of the condenser 27. If the magnitudes of the potentials on the condensers 26 and 27 are the same, the alternate connection of these condensers to the input of the amplifier 42 will not produce any alternating current signal. However, if the magnitude of one of the potentials on one of the condensers is greater than that on the other the difference in magnitudes of the respective pulses applied to the input of the amplifier 42 will produce an alternating current and the phasing of this alternating current will be dependent upon the relative magnitudes of these potentials on the two condensers. With an alternating current signal on the amplifier 42 input there will be an output motor drive signal for the motor 43 and this will be effective to move the slider 36 to a new position upon the slide wire 35 so that the potential from the network 30 will correspond to that originating from the electrode 12 in the solution 11.

If desired, the amplifier 42 may operate as disclosed in the above mentioned Wills patent and produce a control pressure in the conduit 45 which will operate upon the pneumatic valve 46. The valve 46 may be opened or closed to vary one of the constituents in the solution 11 to thereby regulate the reaction in the solution.

In order to stabilize the operation of this circuit, it has been found desirable to add the resistors 40 and 41. The resistor 41 cooperates with the condenser 26 and with the condenser 26 establishes a predetermined time constant in the electrical circuit for the charging of the condenser 26 by the potential existing between the potential electrode 12 and the reference electrode 14. Likewise the resistor 40 is selected so that when cooperating with the condenser 27 there would be a predetermined time constant established in the charging circuit for the condenser 27. In order to adequately damp the operation, the time constant of the resistor 40 and the condenser 27 is made less than the time constant of the resistor 41 and the condenser 26.

It will be noted that when the condenser 26 is connected to be charged by the potential existing between the electrode 12 and the electrode 14 that the electrodes are isolated from any ground connection and therefore it is impossible for any polarizing effects to occur in the reference electrode 14. It will also be seen that when so connected, the condenser 26 and the electrodes 12 and 14 are isolated from the amplifier as well as from the source of rebalancing potential 30. This will tend to minimize any alternating current signal which may be present in the vicinity of the electrodes 12 and 14 since the amplifier is isolated therefrom and will respond only to the direct current potentials existing on the condenser 26 when that condenser is connected to the input of the amplifier. It can also be seen that the source of rebalancing potential is likewise isolated from the input of the amplifiers which also eliminates the effects of any alternating current which may be present in the vicinity of the network 30.

From the foregoing it will be seen that there has been provided a new and improved highly stable measuring apparatus for a direct current source of potential with provisions made for minimizing the effects of stray alternating current signals and preventing grounding of the source of unknown potential to prevent any polarizing tendencies.

While, in accordance with the provision of the statutes, we have illustrated and described the best forms of embodiment of invention known to us, it will be apparent to those skilled in the art that changes may be made in the forms of the apparatus disclosed without departing from the spirit of the invention as set forth in the appended claims, and that in some cases certain features of the invention may be used to advantage without corresponding use of other features.

Having now described our invention what we desire to secure by Letters Patent is as follows:

1. Potential measuring apparatus comprising in combination a variable responsive source of potential, an adjustable source of potential, a first condenser, a second condenser, vibratory switching means connecting said first condenser to said responsive source and connecting said second condenser to said adjustable source, said connections being on alternate half cycles of operation of said switching means, a signal utilization circuit, and means including said vibratory switching means alternately connecting either said first or said second condenser to said utilization circuit.

2. Potential measuring apparatus comprising, a variable responsive source of potential, an adjustable source of potential, a first condenser, a second condenser, vibratory switching means connecting said first condenser to said responsive source and connecting said second condenser to said adjustable source, said connections being on alternate half cycles of operation of said vibratory switching means, a signal utilization circuit having a controlled actuator on the output thereof, means including said vibratory switching means alternately connecting either said first condenser or said second condenser to said utilization circuit, and means connecting the actuator on the output of said utilization circuit to said adjustable source so as to adjust the output of said adjustable source to correspond to the magnitude of the potential from said variable responsive source.

3. In a potential measuring apparatus, the combination comprising, a first condenser, a second condenser, vibratory switching means arranged for connecting said first condenser to an unknown source of potential and connecting said second condenser to an adjustable source of potential, said connections being on alternate half cycles of operation of said switching means, a signal utilization circuit, and means including said vibratory switching means alternately connecting either said first condenser or said second condenser to said utilization circuit.

4. In potential measuring apparatus, the combination comprising, an adjustable source of potential, a first condenser, a second condenser, vibratory switching means arranged for connecting said first condenser to a source of unknown potential and connecting said second condenser to said adjustable source of potential, said connections being made on alternate half cycles of operation of said switching means, a signal utilization circuit having a controller on the output thereof, means including said vibratory switching means alternately connecting either said first condenser or said second condenser when charged by their respective sources of potential to said utilization circuit, and means connecting said controller to said adjustable source of potential so as to adjust the magnitude thereof to correspond to the magnitude of the source of unknown potenital so as to give an indication of the magnitude of the source of unknown potential.

5. In an apparatus for measuring the magnitude of an unknown potential, the combination comprising, a first condenser arranged for alternate connection between the source of unknown potential and an electric utilization circuit, a first resistor in circuit with the first condenser and establishing a predetermined time constant with respect to said first condenser, a second condenser arranged for alternate connection between a source of adjustable potential and said utilization circuit, said second condenser being connected to said utilization circuit during periods when said first condenser is not connected to said utilization circuit, a second resistor in circuit with said second condenser when connected to said adjustable source, said second resistor and condenser having a time constant different than the time constant of said first resistor and condenser, a controlled actuator on the output of said utilization circuit, said actuator adjusting said adjustable source so as to cause said second condenser to assume a potential which corresponds to the potential in first condenser.

6. In a potential measuring apparatus for measuring the potential of an unknown source, the combination comprising, a first condenser, a second condenser, and an adjustable source of potential, vibratory switching means arranged for connecting said first condenser to the source of unknown potential and said second condenser to said adjustable source of potential, said connections being on the alternate half cycles of operation of said switching means, said first condenser when connected to the source of unknown potential forming a first electrical circuit and having therein an electrical impedance element for establishing a predetermined time constant in said first circuit, said second condenser when connected to said adjustable source forming a second circuit and having therein an electrical impedance for establishing a predetermined time constant in said second circuit, said second circuit having a time constant which is shorter than the time constant of said first circuit, an electrical signal utilization circuit, and means including said vibratory switching means alternately connecting said first condenser and said second condenser to said utilization circuit.

7. Apparatus as set forth in claim 6 wherein said signal utilization circuit has an output control arranged for connection to said adjustable source of potential so that said source may be adjusted to the magnitude which will cause the potential on said second condenser to be equal to the potential on said first condenser when said first condenser is connected to the source of unknown potential.

8. Apparatus for measuring the magnitude of an unknown potential, the combination comprising, vibratory switching means including first, second, and third switch blades and contacts cooperating with each of said switch blades, a first condenser, a second condenser, means including said first and second switch blades of said switching means arranged to connect said first condenser to the source of unknown potential, an adjustable source of potential, means including said third switch blade of said switching means for connecting said second condenser to said adjustable source of potential, a signal utilization circuit, said first and second switch blades of said switching means connecting said first condenser to said signal utilization circuit during periods when said switch blades are not connecting said condenser to the source of unknown potential, said third switchblade connecting said second condenser to said utilization circuit, motor means controlled by said signal utilization circuit, and means connecting said motor means to said adjustable source of potential.

9. Electrical measuring apparatus, comprising in combination, a source of unknown potential, a source of known potential, a signal utilization circuit, first and second condensers arranged for connection to said signal utilization circuit, to control the operation of said circuit, vibratory switching means arranged to connect said first condenser to said source of unknown potential and said second condenser to said source of known potential, said first condenser when connected to said source of unknown potential being isolated from said utilization circuit, a first resistor in circuit with said first condenser, and a second resistor in circuit with said second condenser, said first resistor and said first condenser having a time constant longer than the time constant of said second resistor and said second condenser.

10. Electrical measuring apparatus, comprising in combination, a direct current signal utilization apparatus, a first electrical circuit arranged for connection to said utilization apparatus and including a condenser and resistor where said condenser will assume a charge proportional to the magnitude of an unknown direct current potential and said resistor will introduce a predetermined delay in the charging of said condenser, a second electrical circuit arranged for connection to said utilization apparatus and including a condenser and resistor where said condenser will assume a charge proportional to the magnitude of a known direct current potential and said resistor will introduce a predetermined time delay in the charging of said condenser which time delay is less than said first mentioned time delay, vibratory switching means for periodically interrupting the connection of said condensers to their respective sources of potential to produce in said utilization apparatus an alternating signal in accordance with the relative charges on said condensers, said switching means connecting said first electrical circuit to said source of unknown potential and isolating said first electrical circuit from said utilization apparatus, and an electrical controller driven by said utilization apparatus connected to adjust an electrical characteristic of said second circuit so that the electrical charges on said condensers are equal.

11. Potential measuring apparatus comprising in combination a variable responsive source of potential, an adjustable source of potential, a first condenser, a second condenser, vibratory switching means connecting said first condenser to said responsive source and connecting said second condenser to said adjustable source, said connections being on alternate half cycles of operation of said switching means, a signal utilization circuit, and means including said vibratory switching means alternately connecting said first condenser and said second condenser to said utilization circuit and isolating said first condenser from said utilization circuit when said first condenser is connected to said responsive source.

12. Potential measuring apparatus comprising, a variable responsive source of potential, an adjustable source of potential, a first condenser, a second condenser, vibratory switching means connecting said first condenser to said responsive source and connecting said second condenser to said adjustable source, said connections being on alternate half cycles of operation of said vibratory switching means, a signal utilization circuit having a controlled actuator on the output thereof, means including said vibratory switching means alternately connecting said first condenser and said second condenser to said utilization circuit and isolating said first condenser from said utilization circuit when said first condenser is connected to said responsive source, and means connecting the actuator on the output of said utilization circuit to said adjustable source so as to adjust the output of said adjustable source to correspond to the magnitude of the potential from said variable responsive source.

References Cited in the file of this patent

UNITED STATES PATENTS

| Number | Name | Date |
|---|---|---|
| 2,367,746 | Williams, Jr. | Jan. 23, 1945 |
| 2,565,892 | Stanton | Aug. 28, 1951 |
| 2,618,674 | Stanton | Nov. 18, 1952 |
| 2,619,514 | Stanton | Nov. 25, 1952 |
| 2,628,994 | Goodman | Feb. 17, 1953 |